US006368394B1

(12) United States Patent
Hughes et al.

(10) Patent No.: US 6,368,394 B1
(45) Date of Patent: *Apr. 9, 2002

(54) CHROMATE-FREE PHOSPHATE BONDING COMPOSITION

(75) Inventors: John E. Hughes, West Chester; Mark F. Mosser, Perkiomen; Kevin B. Eddinger, Gilberstville; Ronald E. Myers, Pottstown, all of PA (US)

(73) Assignee: Sermatech International, Inc., Limerick, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/420,266

(22) Filed: Oct. 18, 1999

(51) Int. Cl.[7] .............................. C04B 9/04; C04B 9/06
(52) U.S. Cl. ................. 106/14.12; 428/457; 427/376.6; 148/243; 148/261
(58) Field of Search ................... 106/14.12; 427/376.6; 428/457, 469; 148/261, 243

(56) References Cited

U.S. PATENT DOCUMENTS

| 3,248,251 A | 4/1966 | Allen | 106/286 |
|---|---|---|---|
| 3,395,027 A | 7/1968 | Klotz | 106/1 |
| 3,533,859 A | 10/1970 | Engesser et al. | 148/6.15 |
| 4,537,632 A | 8/1985 | Mosser | 106/14.12 |
| 4,755,224 A | 7/1988 | Bibber | 106/14.21 |
| 4,863,516 A | 9/1989 | Mosser | 106/14.12 |
| 4,878,963 A | 11/1989 | Bibber | 148/262 |
| 4,895,608 A | 1/1990 | Bibber | 428/427.2 |
| 4,988,396 A | 1/1991 | Bibber | 148/269 |
| 5,242,488 A | 9/1993 | Stetson | 106/14.12 |
| 5,279,649 A | 1/1994 | Stetson | 106/14.12 |
| 5,279,650 A | 1/1994 | Stetson | 106/141.2 |
| 5,478,413 A | * 12/1995 | Mosser et al. | 148/261 |
| 5,554,231 A | 9/1996 | Bibber | 148/272 |
| 5,803,990 A | 9/1998 | Mosser | 148/261 |
| 5,968,240 A | * 10/1999 | Myers et al. | 106/14.12 |

OTHER PUBLICATIONS

J.A. von Fraunhofer, Basic Metal Finishing, 1976 (Chemical Publishing Co.: New York), pp. 146–151, No Month.

* cited by examiner

Primary Examiner—Deborah Jones
Assistant Examiner—Andrew T. Piziali
(74) Attorney, Agent, or Firm—Drinker Biddle & Reath LLP

(57) ABSTRACT

A heat curable bonding composition for providing a coating to a solid substrate comprises water, phosphate ions, borate ions, and aluminum ions. The bonding composition has a pH in the range from about 1.4 to about 2.2, and is substantially free of chromate ions, molybdate ions, and magnesium ions.

29 Claims, 2 Drawing Sheets

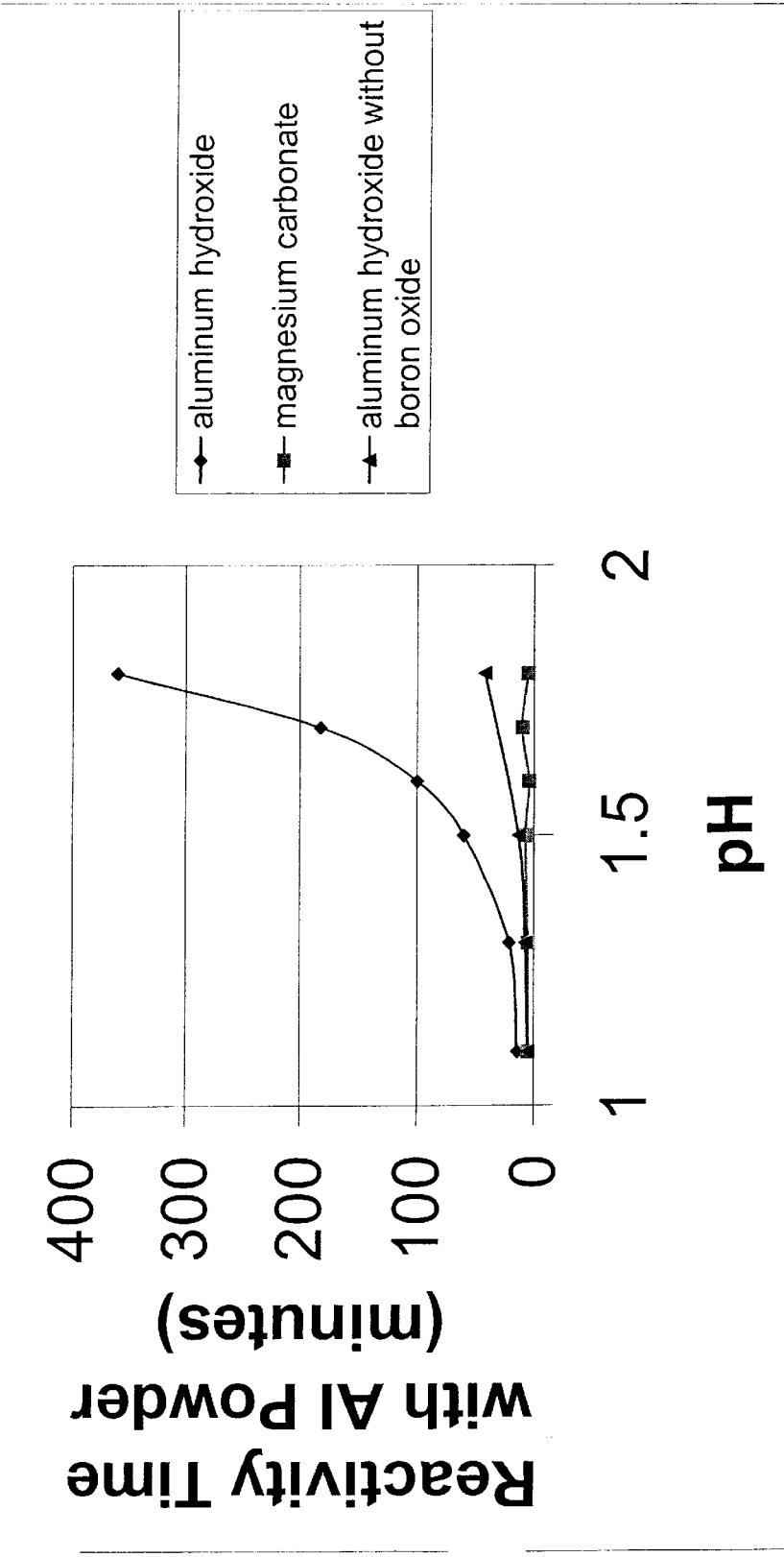

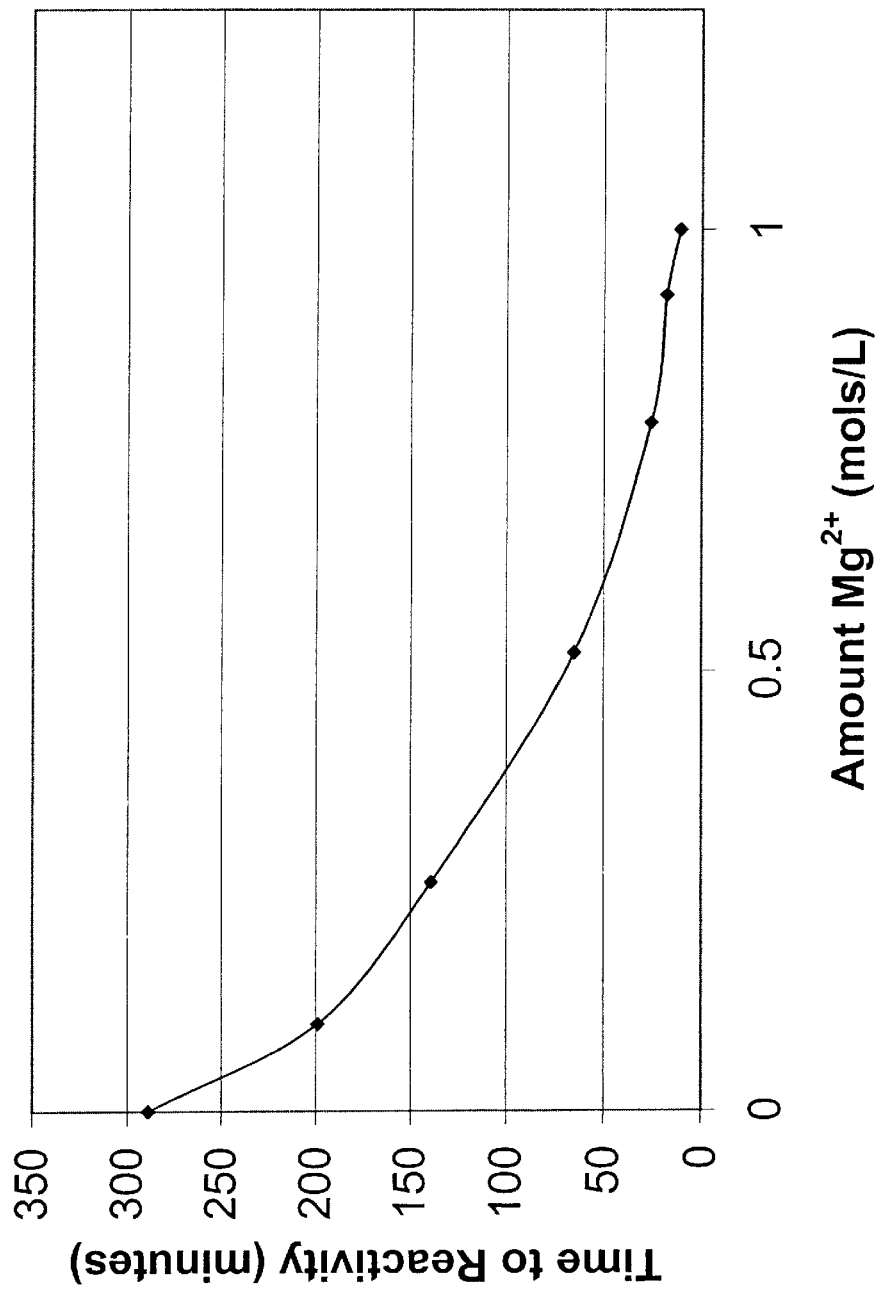
Figure 2: Stability with Al Powder with varying Levels of $Mg^{2+}$

CHROMATE-FREE PHOSPHATE BONDING COMPOSITION

FIELD OF THE INVENTION

The present invention relates generally to the field of corrosion protection for metal substrates, and more specifically to bonding solutions and coating compositions free, or substantially free, of carcinogenic or toxic metals.

BACKGROUND OF THE INVENTION

Compositions comprising phosphoric acid and aluminum metal are well known for use in protecting metallic surfaces such as ferrous surfaces from corrosion. In such coating compositions, particulate metallic aluminum, in the form of flake and/or powder, for example, is combined with a phosphoric acid bonding solution to form a coating composition which is then applied to the metallic surface being treated. After application of the coating to the surface, it may be heated to a first temperature, generally upwards of 500° F. (260° C.), until the coating is rendered essentially water insoluble. Then the coated surface may be cured at a second temperature, generally above 1000° F. (538° C.) to form the final protective coating.

It is often further desirable to provide an extra protective barrier to the metal surface that may provide thermal resistance or simply augment the corrosion protection afforded by the coating and bonding solution described above. In such case, the coating resulting from the combination of particulate metallic aluminum and phosphoric acid bonding solution is termed an "undercoat" or "basecoat". An extra protective layer applied to the cured undercoat is termed a "topcoat". The topcoat may be formed from a bonding solution similar to that used in the undercoat, but containing little or no particulate metal. The result, upon application and curing, is a glassy, ceramic-like layer that provides water resistance, thermal resistance, and augmented corrosion protection. Such a topcoat composition, as known in the art, often contains chromate. The topcoat bonding composition may further contain a pigment which imparts visually aesthetic qualities to the coating. The pigment(s) may also be functional and improve certain properties such as corrosion resistance, erosion life, and bond strength.

Though basecoat coating compositions contain particulate aluminum metal, care must be taken in the preparation of phosphate-based coatings. The phosphoric acid bonding solution can react with the aluminum. Such reactions are considerably exothermic and can be very violent, causing the aluminum powder to burn or even explode. These reactions may result in the conversion of the metallic aluminum into various salts. Protective topcoats, though not containing particulate aluminum metal, are equally susceptible to reaction with metallic aluminum because protective topcoats are directly applied to metallic aluminum-containing basecoats. In either case, such reactions interfere with the formation of suitable protective coatings. Thus, the reactive stability of a coating formulation in the presence of metallic aluminum is of foremost concern.

U.S. Pat. No. 3,248,251 to Allen, describes coating compositions consisting essentially of a slurry of solid inorganic particulate material (such as metallic aluminum) in an aqueous acidic bonding solution containing dissolved metal chromate, dichromate or molybdate, and phosphate. Allen discloses that the addition of chromates or molybdates to the acidic bonding solution effectively passivates the solution toward aluminum and inhibits the oxidation of metallic aluminum, allowing particulate aluminum to be combined with the bonding solution without the undesirable chemical reaction between the acidic bonding solution and the aluminum.

These "Allen" coatings have been, and still are, successfully used to provide high quality coatings which protect ferrous metal alloy surfaces from oxidation and corrosion, particularly at high temperatures. It is also known that the inclusion of chromium or molybdenum in the coating composition, whether used in corrosion resistant basecoats or protective topcoats, provides a coating having improved corrosion resistance.

However, while chromates and molybdates have been used successfully to reduce the reactivity of the aluminum in such coating compositions and to improve the corrosion resistance in the coatings, the use of chromates and molybdates has become a problem because of environmental considerations. Chromates are considered carcinogenic. Molybdenum is classified as a toxic heavy metal. It is therefore desirable to avoid the use of solutions of their salts, or at least to reduce their use. For this reason, it has become desirable to develop a phosphate/aluminum corrosion resistant basecoat composition which requires little or no chromate or molybdate to control the reactivity between the acidic phosphate bonding solution and the particulate aluminum added thereto. Similarly, it has become equally desirable to develop a protective topcoat having little or no chromate or molybdate. Such coating compositions should protect ferrous metal alloy surfaces from oxidation and corrosive environmental conditions, especially at high temperatures, approximately as well as and preferably better than the so-called Allen coatings.

Efforts have been made to exclude chromate and molybdate from coating compositions while maintaining stable formulations. U.S. Pat. No. 5,242,488 to Stetson et al., describes a basecoat coating composition for ferrous alloys which does not require either chromates or molybdates to control the reaction between the bonding solution and the powdered aluminum. The composition consists essentially of a slurry mixture of a bonding solution and aluminum powder. The bonding solution consists essentially of water, phosphoric acid ($H_3PO_4$), and aluminum ions. The bonding solution must contain sufficient aluminum ions in solution so that it is substantially equilibrated with respect to aluminum metal pigments, i.e., the amount of aluminum in solution must be substantially at the saturation point, thus leaving the bonding solution essentially inert with respect to any subsequent additions of aluminum.

This Stetson patent also teaches that magnesium may desirably be used to at least partially neutralize the aqueous phosphoric acid mixture, either before or after equilibration of the mixture with aluminum. The magnesium compound used is either MgO or $MgCO_3$. All examples given in the patent utilize magnesium ions.

U.S. Pat. No. 5,279,649, also to Stetson, et al., discloses substantially the same compositions to which $V_2O_5$ has been added to produce vanadate ion, adding another inhibitor to the aluminum equilibrated mixture. Addition of $V_2O_5$ is an example of the addition of a toxic substance, listed on the OSHA extremely hazardous substance list and also subject to Clean Air Act and CERCLA regulation.

These Stetson coating compositions are designed to avoid the use of chromate and molybdate ions and require the bonding solution to be equilibrated with respect to further additions of aluminum as described in these patents.

Although the Stetson patents indicate that these formulations control the reactivity between the bonding solution and the aluminum, some reaction still occurs between the bonding solution and the powdered aluminum when the slurry compositions of the Stetson patents are formulated.

U.S. Pat No. 5,478,413 to Mosser et al. is directed to coating compositions lacking chromium or molybdenum. These coatings are pigmented with aluminum powder and can be applied to all ferrous alloys. These coatings require that magnesium ion be present in a bonding solution to promote stability toward the aluminum metal, and that the pH of the composition be between 2.0 and 4.5.

Chromate-free coating compositions of the prior art suffer the disadvantage that composition stability decreases, often dramatically, as pH is lowered below, for example, 2.0. This is unfortunate since lower pH values generally promote better dissolution of constituent species and better film-forming coating compositions. In attempting to raise pH to more acceptable, higher levels (e.g., greater than 2.0), the risk is conversely run that certain ionic species may precipitate out of solution.

It is therefore desired to formulate a chromate- and molybdate-free bonding composition, or one which is of reduced chromium and molybdenum content, which not only has a reduced reactivity with particulate aluminum when the two are combined to form a coating composition, but that is also stable at lower pH values. Such a bonding solution should also form, upon curing, a hard, glossy surface. Such a bonding solution should also bond to, but not react with, ferrous alloys to the extent that a conversion coating or a Fe-phosphate layer (such as described in von Fraunhofer, J. A. *Basic Metal Finishing*, 1976 (Chemical Publishing Co.: New York), pp. 146–151; incorporated herein by reference) would be produced. The present invention provides such a composition.

SUMMARY OF THE INVENTION

A heat curable bonding composition for providing a coating to a solid substrate is provided, comprising water, phosphate ions, borate ions, and aluminum ions. The bonding composition has a pH in the range from about 1.4 to about 2.2 and the composition is substantially free of chromate ions, molybdate ions, and magnesium ions.

A heat curable coating composition is provided comprising metallic aluminum particles dispersed in a bonding composition, the bonding composition comprising water, phosphate ions, borate ions, and aluminum ions, wherein the amount of aluminum ions in solution is less than necessary to equilibrate the solution with respect to the metallic aluminum particles. The composition has a pH in the range from about 1.4 to about 2.2 and is substantially free of chromate ions, molybdate ions, and magnesium ions.

In an alternative embodiment of the invention, a heat curable coating composition is provided, comprising metallic aluminum particles dispersed in a bonding composition. The bonding composition in such embodiment comprises water, phosphate ions, borate ions, magnesium ions, and aluminum ions. The amount of aluminum ions in solution is less than necessary to equilibrate the solution with respect to the metallic aluminum particles. The bonding composition has a pH in the range greater than or equal to 1.4 and less than 2.0, and the coating composition is substantially free of chromate ions and molybdate ions. In such an embodiment of the invention, the bonding composition is stable with respect to the metallic aluminum particles for a least one hour under ambient conditions.

The bonding compositions of the invention may be employed as heat curable topcoat coating compositions. The bonding compositions of the invention may be combined with metallic aluminum particles in heat curable compositions, especially for use in basecoat coating applications.

An article of manufacture is provided comprising a substrate with a coating, the coating prepared by a method comprising the steps of providing a heat curable coating composition of the invention, applying the coating composition to the substrate, and heating the substrate thereon to form a heat cured coating. The coating composition may be a topcoat coating composition or a basecoat coating composition.

BRIEF DESCRIPTION OF THE FIGURES

FIG. 1 is a graph illustrating the relationship between stability with respect to aluminum powder and pH, in different bonding compositions.

FIG. 2 is a graph illustrating the relationship between stability with respect to aluminum powder and magnesium ion concentration in a bonding composition.

DETAILED DESCRIPTION OF THE INVENTION

A heat curable bonding composition of the present invention comprises an aqueous solution containing phosphate ions, borate ions, and aluminum ions. A bonding composition preferably has a pH in the range of about 1.4 to about 2.2, and most preferably about 1.7 to about 1.9. The coating composition may further comprise metal cations, such as those for example, selected from the group consisting of iron ions, cerium ions, cobalt ions, nickel ions, manganese ions, chromium (III) ions, lithium ions, copper ions, and zinc ions.

Magnesium ions are excluded from a preferred embodiment of the invention. It has been determined, as further discussed herein, that magnesium ions tend to have a destabilizing effect on bonding compositions at lower pH values. Bonding compositions with excessive levels of magnesium ions are not exceptional film-forming compositions. Bonding compositions containing appreciable levels of magnesium ions, when cured, tend to expand and take on a powdery appearance. Film formation is an important property for topcoat applications; the better the ability to form a film, the better the sealing properties of the composition. A topcoat must exhibit excellent sealing properties in order to protect a basecoat (or substrate) from corrosion or damage.

A preferred bonding composition of the invention is substantially free of chromate ions, molybdate ions, and magnesium ions. "Substantially free", as used herein, is understood to mean completely free of said constituent, or inclusive of only trace amounts of the same. "Trace amounts" are those quantitative levels of a chemical constituent that are barely detectable and provide no benefit to the functional or aesthetic properties of the subject composition. For example, a trace amount may constitute 0.01% (wt.) of the bonding composition. As used herein, the term "chromate" refers to chromate ion, dichromate ion, hexavalent chromium ion and any other ion in which chromium has a valence or oxidation state of +6.

A bonding solution of the invention may be applied as a protective topcoat, but can also be used as a coating for ferrous alloys, aluminum alloys, nickel alloys, titanium alloys, cobalt alloys, and other metal surfaces. It can be applied to a variety of metallic surfaces, glass, and ceramics, limited only by the surface's ability to survive the curing process and the surface's relative lack of reactivity with the coating composition. A topcoat formed in accordance with the present invention has a thickness in the range from about 0.1 mil to about 1.0 mil (1 mil=$\frac{1}{1,000}$ in).

As used herein, the term "topcoat" refers to an acidic bonding composition substantially free of particulate metal that is applied to a cured basecoat in order to provide additional protection from corrosion, heat, water, and the like. A topcoat may also be applied directly to a metal substrate, as well. A topcoat layer applied directly to a metal substrate as the only protective barrier may be up to about 3.0 mils thick, and possibly greater. A topcoat may or may not contain a pigment. A basecoat is understood to refer to a particulate metal-containing acidic composition applied directly to a metal substrate and having a principal function of corrosion resistance when applied to ferrous metal substrates.

Although one or more individual components of a bonding solution may have low or reduced solubility or miscibility in water or in aqueous phosphoric acid, ideally the composition as a whole should be an aqueous solution. It is recognized, however, that some of the less soluble or miscible components may be present in suspension or other non-solution form. Thus, in accordance with the invention, the term "aqueous solution" or "bonding solution" is intended to include a composition in which one or more of its components may not be fully dissolved, but may be present in other form.

A basecoat composition of the invention generally comprises a bonding solution of the invention combined with particulate metal (preferably aluminum) dispersed therein.

Phosphate ion may be introduced into an aqueous bonding solution of the present invention in the form of phosphoric acid, in the form of phosphates of the metal or metals desired to be included as a metal cation, or in both forms. Any source of soluble phosphate may be used, though such choice may be limited by environmental considerations and pH effects. The preferred source of phosphate ions is phosphoric acid, and in particular, a commercially-available 85% phosphoric acid solution.

It is understood that the term "phosphate" is intended to include not only the $PO_4^{-3}$ ion, but also $HPO_4^{-2}$ and $H_2PO_4^{-}$ ions. All three, for example, result from the dissociation and ionization of $H_3PO_4$ in solution and the hydrogen phosphate ions generally will, to some extent, be present in the compositions of this invention.

Borate ion may be introduced to an aqueous bonding solution of the present invention in the form of boron oxide, boric acid, or in the form of other acid-soluble borate salts. Boron oxide and boric acid are the preferred forms.

In a preferred embodiment of a bonding composition of the invention, the ratio of the number of moles of phosphate ion to borate ion is from about 3.4:1 to about 20.3:1, preferably about 3.4:1 to about 6.8:1, and most preferably about 3.4:1 to about 4.1:1.

Aluminum ions ($Al^{+3}$) are preferably introduced to a bonding composition of the invention in the form of aluminum hydroxide. Aluminum hydroxide is preferably in the form of a dried gel. Acceptable sources of aluminum ions include aluminum oxide, aluminum metal, and aluminum dihydrogen phosphate. Any source of aluminum ions is acceptable as long as such source will dissolve in the acidic bonding composition and does not produce anions that will negatively impact the coating composition.

Aluminum ions are present in bonding compositions of the invention in a concentration less than that necessary to equilibrate the composition with respect to any particulate aluminum metal that could be added in the preparation of an aluminum coating composition. That is, the amount of aluminum ions dissolved in the bonding solution is an amount less than that which permits undissolved aluminum. The concentration of aluminum ions in a bonding composition of the invention is pH-dependent and does not approach saturation. Preferably, the concentration of aluminum ions does not exceed about 1.3 mol/L at pH of about 2.0.

In a preferred embodiment of a bonding composition or coating composition of the invention, the molar ratio of aluminum ions to phosphate ions is in the range from about 0.1:1 to about 0.75:1.

In a preferred embodiment of a bonding composition or coating composition of the invention, the molar ratio of the sum of aluminum ions and borate ions (mols $Al^{+3}$+mols $BO_3^{-3}$) to phosphate ions is in the range of about 0.25:1 to about 0.85:1.

A bonding composition of the present invention may further include at least one species of metal cation, preferably selected from the group consisting of iron ions, cerium ions, cobalt ions, chromium(III) ions, nickel ions, manganese ions, lithium ions, copper ions, and zinc ions. Most preferably, the metal cation is selected from the group consisting of zinc ions, nickel ions, and lithium ions. These ions may be delivered as, for example, carbonates, phosphates, oxides, or hydroxides of the respective cation. Free metals may also be introduced to acid solution as a source of metal cation. Halide ions are not desirable in the bonding compositions of the invention.

Metal cations may participate in controlling the pH of the bonding solution. However, it is believed that metal ions in the bonding solution act as "modifying ions". These ions are believed to serve as cross-linking agents for the phosphorus-oxygen chains formed in the cured matrix and thus promote hard, smooth, glossy and water insoluble coatings when cured. These ions may have a substantial impact on the physical properties characteristic of the coating, such as viscosity, film forming properties, and thermal stability.

Environmental considerations may limit the acceptable choices of cations introduced to the solution. Cobalt or nickel ions, for example, are listed as carcinogens or suspect carcinogens and may be omitted from a formulation. However, some toxic metallic ions, despite a listing as such, may be included in the bonding composition in concentrations below the regulated levels of those ions.

Water usually constitutes the balance of the bonding composition of the invention. Water, preferably deionized, is present in sufficient quantity to solubilize the composition components and in such quantity to achieve the desired pH.

In a preferred embodiment, bonding compositions of the invention may preferably be adjusted to a pH in the range from about 1.4 to about 2.2, most preferably from about 1.7 to about 1.9. As the pH is dependent upon the concentration of the several constituents in the bonding solution, the pH of the bonding solution may be adjusted accordingly, by addition of selected amounts of a particular constituent.

The pH is generally most dependent on the amount of phosphoric acid in the bonding composition. The lower the concentration of phosphoric acid in the bonding composition, the less aluminum hydroxide, for example, is needed to bring the pH into the desired ranges. Conversely, the higher the concentration of phosphoric acid in the bonding composition, the more aluminum hydroxide is needed to increase the pH to the appropriate ranges.

The pH of a bonding composition is also dependent upon the concentration of borate ion source, such as boron oxide or boric acid. It has been observed that when $B_2O_3$ is added to a solution of phosphoric acid and water, the pH will tend to decrease and the more aluminum hydroxide will be required to adjust the pH into a favorable range. Boron oxide may be added to the bonding composition until the solution becomes saturated and contains undissolved boron oxide.

It is assumed that all soluble components in the bonding solution completely dissolve.

As noted above, a bonding solution to be employed as a topcoat may incorporate a pigment. In such case, the addition of a pigment to an aqueous bonding solution would create a suspension of the pigment in the composition. A pigmented bonding solution may contain a water-insoluble pigment, a surfactant to help disperse the pigment, and an organic solvent to promote sprayability of the pigmented solution. It is contemplated that any water-insoluble pigment may be successfully delivered in the bonding solution of the present invention. The choice of pigment may be dependent upon aesthetic concerns. Any pigment may be employed as long as it is stable in the acidic bonding solution, can survive the curing process, and is delivered in sufficiently small particles so as to enable the surface profile or smoothness of the cured coating to be within acceptable tolerances for a particular application. Acceptable pigments may be found in the Federation of Societies for Coating Technology's Series on Coatings Technology.

Water-insoluble materials that impart functional properties to the bonding composition, and not necessarily a desired color, are also understood to be "pigments". For example, refractory metal compounds such as silica, zirconia, alumina, silicon carbide, aluminum silicate, and metal powders may be added for higher heat resistance. Dry lubricants such as, for example, graphite or tungsten disulfide, may also be added to the composition. The coating compositions of the present invention may also include one or more leachable corrosion inhibitors. The leachable pigment is one which is capable of inhibiting or passivating the corrosion of a metal substrate. The leachable pigment is preferably a salt containing environmentally acceptable metals, such as zinc aluminum phosphate and others set forth in "Inorganic Primer Pigments," Federation Series on Coatings Technology, which is incorporated herein by reference.

The preparation of a pigmented topcoat composition of the invention requires that the pigment be added to a quantity of a bonding solution of the invention.

A surfactant solution may be added to a bonding or coating composition of the present invention to promote sprayability and film-forming properties. For example, if a surfactant is utilized, a volumetric equivalent of about 10% of the bonding solution is added, containing surfactant solution. The surfactant may be any commercially-available surfactant that is compatible with the solution. A preferred surfactant is Triton X-100 from Union Carbide, which is an octlyphenoxypolyethoxyethanol non-ionic surfactant. The surfactant is preferably diluted in deionized water to form a surfactant solution so that it is about 0.06 wt % of the surfactant solution. Cellosolve acetate or other solvents can be added to improve sprayability. Depending on the solvent added, up to 25% by volume of organic solvent may be added to the composition. The use of a surfactant or an organic solvent is not required to apply coating compositions of the present invention.

The preparation of bonding compositions and coatings of the present invention follows conventional methods well-known in the art. The components of a bonding composition are added and mixed at room temperature under low-shear mixing conditions.

Bonding compositions of the present invention are particularly useful for forming basecoat coating compositions when combined with particulate aluminum. When particulate aluminum is incorporated in the bonding compositions of the invention, such particles may be inert gas atomized spherical, air atomized, flake, flake/atomized mixtures, or aluminum alloys. Acceptable particle sizes would be recognized by those skilled in the art, especially in view of sprayability considerations. In addition to aluminum, particulate nickel is also acceptable in the coating compositions of the invention.

In another preferred embodiment of the invention, a coating composition is provided comprising particulate metallic aluminum dispersed in a bonding composition, wherein the aqueous bonding composition contains—in addition to phosphate ions, borate ions, and aluminum ions—magnesium ions, in an amount dictated by pH and stability considerations. In this embodiment of the invention, the pH of the bonding composition is preferably in the range from about 1.4 to less than 2.0, and the coating composition is preferably stable for at least one hour following the introduction of particulate aluminum metal to the bonding composition.

In such embodiment, the amount of aluminum ions in the bonding composition preferably constitutes the single most populous metallic cationic species in the bonding composition. That is, the amount of aluminum ions in the bonding composition constitutes the largest amount in ionic concentration of any metallic cationic species. Magnesium ions are present in the composition of this embodiment in a concentration that does not exceed about 0.5 moles/liter.

A bonding composition is stable in contact with particulate metal (e.g., aluminum powder) when no reaction between the acidic bonding composition and the particulate metal is observed under ambient conditions. Signs of reaction include bubbling, volume expansion, heat generation, change in viscosity and, ultimately, solidification. Ambient conditions are understood to refer to room temperature in open air at atmospheric pressure. Bonding compositions of the invention are preferably stable under ambient conditions with respect to particulate aluminum metal for a period of at least one hour following the introduction of aluminum powder to the bonding composition, more preferably at least two hours, and most preferably at least four hours.

The coating compositions of the invention are applied in conventional ways to the metal substrate surface or, in the case of protective topcoats, directly to a cured basecoat. It is contemplated that all metallic substrates are candidates for protective coatings of the present invention. While ferrous alloy substrates are the preferred metal substrate, it is believed that any solid substrate is, in fact, a suitable candidate for the coatings of the present invention, limited only by the ability of the solid substrate to survive the curing process and be compatible with the coating.

Protective topcoats of the present invention are similarly applied to cured corrosion resistant basecoats in conventional ways. These protective topcoats may also be applied directly to a metal substrate, lacking a basecoat, for those instances where protective demands do not include corrosion resistance.

When applying the coatings, it is generally desirable to degrease the part to be coated, abrade the surface, and apply the coating of the invention by any suitable means, such as by spraying, brushing, dipping, dip spinning, and the like.

The coating is dried, then cured. "Curing" refers to heat induced chemical changes that solidify the topcoat composition. The coatings of the invention, both basecoats and topcoats, are dried at about 175° F. for about 10 to 15 minutes. Curing preferably takes place at 650° F. for about 30 minutes. Curing may take place at higher temperatures (and shorter times), or at lower temperatures and longer times, such as 350° F. for about 24 hours. Cured coatings are to be distinguished from chemical conversion coatings (or "phosphating" treatments), which require a chemical interaction with the metallic substrate to form the protective coating. Conversion coatings are formed by the chemical reaction between the coating composition and the particular substrate surface. Conversion coatings typically cannot survive the curing process as described above.

The basecoats as cured at 650° F. are not electrically conductive and therefore cannot provide galvanic protection against corrosion of the underlying substrate material. However, the coating may be made electrically conductive by burnishing with glass beads, the use of abrasive media at low application pressure, or mechanically cold-working in other ways to produce a conductive sacrificial coating or by heating as specified in MIL-C-81751B specification (incorporated herein by reference). In this manner the coatings can, by mechanical or thermal processes, be made electrically conductive and thereby produce galvanic as well as barrier protection of the underlying ferrous alloy substrate. Desirably, after a second basecoat is applied, dried, cured and processed to make it electrically conductive, the surface of the coating is sealed with the topcoat bonding solution to further increase the oxidation and corrosion protection provided by the coating, and to decrease the rate of consumption of aluminum in the coating during service. The topcoat also reduces the profile of the coating, making the surface smoother than it would be without a topcoat. The topcoats are also dried and cured, as above.

An article of manufacture is provided having a heat curable coating applied thereon. The article of manufacture is a substrate having a bonding composition or coating composition of the invention applied to the substrate, then the applied composition is heat cured to form the coated article. The coated article may employ a topcoat coating of the invention, a basecoat coating of the invention or both. The substrate may be any solid substrate, limited only by the ability of the solid substrate to survive the curing process and be compatible with the coating. The substrate may have a basecoat applied thereon before receiving a heat curable coating composition of the invention.

In assessing the desirability of a particular bonding composition or coating composition, several qualitative properties are evaluated. Two properties of primary concern for a bonding or coating composition are (a) film-forming characteristics for a cured composition and (b) the stability of an uncured composition in contact with a metal or metal-containing substrate. A composition's stability is relevant to both basecoat and protective topcoat applications. For basecoats, it is important to know the stability of an uncured bonding composition in contact with particulate aluminum. Further, a protective topcoat may be applied directly onto a burnished particulate aluminum-containing basecoat, the uncured topcoat would be in direct contact with metallic aluminum exposed on a high surface area substrate.

The sprayability of a basecoat or topcoat composition is also important. Sprayability is a measure of the ease with which the composition may be mechanically sprayed to a substrate. Sprayability is dependent upon the Theological properties of the composition, which in turn are dependent upon the stability of the composition, the concentrations of constituent species, and temperature.

There are several advantages to bonding compositions of the present invention. As noted, these compositions do not contain, or are substantially free of, chromate or molybdate ions. This is an environmental objective. In situations where more permissive environmental conditions permit the use of such metals as chromium, molybdenum, nickel, and others, it is possible to use such metals in the bonding and/or the coating composition. However, coatings produced from compositions of the present invention exhibit corrosion resistance properties as good as, if not better than, chromate- or molybdate-containing coatings. Bonding compositions and coating compositions of the invention exhibit film-forming characteristics superior to that of chromate- or molybdate-free formulations previously known. Bonding compositions of the invention are also as stable towards particulate aluminum, if not more stable, than chromate- or molybdate-free bonding compositions of the prior art. The compositions also exhibit excellent sprayability.

Additionally, bonding compositions of the present invention, upon curing, form clear, hard, glossy coatings. The term "glossy" is understood to describe a surface that has a degree of luster and shine, almost satin-like in appearance. These topcoats also provide a very smooth surface, or profile, required for certain applications where boundary layer effects must be minimized, such as in aerospace applications. Clear topcoats of the present invention can provide surface profiles having an $R_a$ value less than 30 microinches at 0.030 inches cut-off.

The following Examples are merely illustrative of the invention and are not intended to be limiting. Curing, where noted, occurred at 650° F. for about 30 minutes after drying at 175° F. for about 10 to 15 minutes.

Where aluminum powder is employed in aluminum coating compositions in the following examples, the aluminum powder constitutes air atomized particles having an average particle size of 4.5–10 $\mu$m. Air atomized or inert gas atomized aluminum particles having an average particle size of less than 4.5 $\mu$m are also contemplated, as are particles greater than 10 $\mu$m.

Examples 1–5 illustrate bonding compositions and aluminum coating compositions of the invention.

EXAMPLE 1

A bonding composition "A" was prepared by combining the following:

| | |
|---|---|
| 80 ml | Deionized water |
| 36.8 ml | 85% phosphoric acid |
| 7.4 g | Borogard ® ZB |
| 1.6 g | Ferric phosphate |
| 136.6 ml | Deionized water |
| 14.2 g | ZPA |
| 15.6 g | Aluminum hydroxide |

The pH of the bonding composition obtained was 2.0. Borogard® ZB (U.S. Borax) is a commercially-available form of zinc borate ($2ZnO \cdot 3B_2O_3 \cdot 3.5\ H_2O$). Borogard® ZB dissolves in acidic solution to deliver borate ions. ZPA (Heucophos® ZPA) is zinc aluminum orthophosphate hydrate. In acidic solution, ZPA dissolves to deliver zinc, aluminum, and phosphate ions. An aluminum coating composition was prepared by combining the following:

| | |
|---|---|
| 100 ml | Bonding composition "A" |
| 80 g | Aluminum powder |

No visible signs of reaction between the bonding composition and the aluminum powder were observed during the 24 hour period following the introduction of the powder to the bonding composition. Signs of reaction include visible bubbling, volume expansion, heat generation, change in viscosity and, ultimately, solidification.

EXAMPLE 2

A bonding composition "B" was prepared by combining the following:

| | |
|---|---|
| 80 ml | Deionized water |
| 36.8 ml | 85% phosphoric acid |
| 5.6 g | Boron oxide |
| 2.8 g | Zinc oxide |
| 17.2 g | Aluminum hydroxide |
| 80 ml | Deionized water |

The pH of the bonding composition obtained was 2.1. An aluminum coating composition was prepared by combining the following:

| | |
|---|---|
| 100 ml | Bonding composition "B" |
| 80 g | Aluminum powder |

No signs of reaction between the bonding composition and the aluminum powder were observed during the 6 hour period following the introduction of the powder to the bonding composition.

EXAMPLE 3

A bonding composition "C" was prepared by combining the following:

| | |
|---|---|
| 160 ml | Deionized water |
| 73.6 ml | 85% phosphoric acid |
| 15.0 g | Boron oxide |
| 5.6 g | Zinc oxide |
| 34.4 g | Aluminum hydroxide |
| 160 ml | Deionized water |

The pH of the bonding composition obtained was 1.9. An aluminum coating composition was prepared by combining the following:

| | |
|---|---|
| 20 ml | Bonding composition "C" |
| 16 g | Aluminum powder |

No signs of reaction between the bonding composition and the aluminum powder were observed during the 4 hour period following the introduction of the powder to the bonding composition.

EXAMPLE 4

A bonding composition "D" was prepared by combining the following:

| | |
|---|---|
| 160 ml | Deionized water |
| 73.6 ml | 85% phosphoric acid |
| 11.2 g | Boron oxide |
| 10.0 g | Zinc oxide |
| 34.4 g | Aluminum hydroxide |
| 160 ml | Deionized water |

The pH of the bonding composition obtained was 2.2. An aluminum coating composition was prepared by combining the following:

| | |
|---|---|
| 20 ml | Bonding composition |
| 16 g | Aluminum powder |

No signs of reaction between the bonding composition and the aluminum powder were observed during the 36 hour period following the introduction of the powder to the bonding composition.

EXAMPLE 5

A bonding composition "E" was prepared by combining the following:

| | |
|---|---|
| 100 ml | Deionized water |
| 30 ml | 85% phosphoric acid |
| 5.0 g | Boron oxide |
| 10.0 g | Zinc oxide |
| 5.0 g | Zirconium carbonate |
| 3.0 g | ZPA |
| 5.0 g | Aluminum hydroxide |

The pH of the bonding composition obtained was 2.0. An aluminum coating composition was prepared by combining the following:

| | |
|---|---|
| 20 ml | Bonding composition "E" |
| 16 g | Aluminum powder |

No signs of reaction between the bonding composition and the aluminum powder were observed during the 8 hour period following the introduction of the powder to the bonding composition.

EXAMPLE 6

A bonding composition "G" was prepared by combining the following

| | |
|---|---|
| 80 ml | Deionized water |
| 36.8 ml | 85% phosphoric acid |
| 2.8 g | Zinc oxide |
| 1.6 g | Ferric phosphate |
| 24 g | Magnesium carbonate |
| 48 ml | Deionized water |
| 5.0 g | Boric acid |
| 88.6 ml | Deionized water |
| 14.2 g | ZPA |
| 16.5 ml | 85% phosphoric acid |

The pH of the bonding composition obtained was 2.0. An aluminum coating composition was prepared by combining the following:

| | |
|---|---|
| 20 ml | Bonding composition "G" |
| 16 g | Aluminum powder |

Visible signs of reaction between the bonding composition and the aluminum powder were observed 5 minutes after the introduction of the powder to the bonding composition. At low pH values, magnesium ions accelerate the rate of reaction between the bonding composition and the aluminum powder.

EXAMPLE 7

A bonding composition "H" was prepared by combining the following:

| | |
|---|---|
| 80 ml | Deionized water |
| 36.8 ml | 85% phosphoric acid |
| 7.4 g | Borogard ® ZB |
| 1.6 g | Ferric phosphate |
| 136.6 ml | Deionized water |
| 14.2 g | ZPA |
| 13.4 g | 2:1 wt./wt. ratio of aluminum hydroxide/magnesium carbonate |

The pH of the bonding composition obtained was 2.0. An aluminum coating composition was prepared by combining the following:

| | |
|---|---|
| 20 ml | Bonding composition "H" |
| 16 ml | Aluminum powder |

Visible signs of reaction between the bonding composition and the aluminum powder were observed 4 hours after the introduction of the aluminum powder to the bonding composition. Bonding composition "H" differed from bonding composition "A" (Example 1) by including magnesium carbonate; a significantly decreased stability is observed in the aluminum coating composition based upon bonding composition "H".

Examples 8–13 illustrate the stability towards aluminum powder promoted by aluminum hydroxide in a bonding composition at pH values less than 2.0, as opposed to magnesium carbonate.

EXAMPLE 8

A bonding composition "I" was prepared by combining the following:

| | |
|---|---|
| 80 ml | Deionized water |
| 13.4 ml | 85% phosphoric acid |
| 1.7 g | Boron oxide |
| 8.2 g | Aluminum hydroxide |

The pH of the bonding composition was 1.8. Bonding composition "I" is a bonding composition of the invention. An aluminum coating composition was prepared by combining the following:

| | |
|---|---|
| 20 ml | Bonding composition "I" |
| 16.0 g | Aluminum powder |

No signs of reaction between the bonding composition and the aluminum powder were observed during the 6 hour period following the introduction of the aluminum powder to the bonding composition.

EXAMPLE 9

A bonding composition "J" was prepared by combining the following:

| | |
|---|---|
| 80 ml | Deionized water |
| 13.4 ml | 85% phosphoric acid |
| 1.7 g | Boron oxide |
| 8.1 g | Magnesium carbonate |

Bonding composition "J" is not a bonding composition of the invention. The pH of bonding composition "J" was 1.8. An aluminum coating composition was prepared by combining the following:

| | |
|---|---|
| 2.0 ml | Bonding composition "J" |
| 16.0 g | Aluminum powder |

Visible signs of reaction between the bonding composition and the aluminum powder were observed 5 minutes after the introduction of the aluminum powder to the bonding composition.

A comparison of Examples 8 and 9 demonstrates the resulting instability in an aluminum coating composition when magnesium ions replace aluminum ions in a low pH (pH=1.8) bonding composition employed to prepare the coatings.

EXAMPLE 10

A bonding composition of the invention, "K", was prepared by combining the following:

| | |
|---|---|
| 80 ml | Deionized water |
| 13.4 ml | 85% phosphoric acid |
| 1.7 g | Boron oxide |
| 8.0 g | Aluminum hydroxide |

The pH of the bonding solution was 1.6. An aluminum coating composition was prepared by combining the following:

| | |
|---|---|
| 20 ml | Bonding composition "K" |
| 16.0 g | Aluminum powder |

No signs of reaction between the aluminum powder and the bonding composition were observed for at least the 100 minute period following the introduction of the aluminum powder to the bonding composition.

EXAMPLE 11

A bonding composition not of the invention, "L", was prepared by replacing the aluminum hydroxide of bonding composition "K" with magnesium carbonate. Bonding composition "L" was prepared by combining the following:

| | |
|---|---|
| 80 ml | Deionized water |
| 13.4 ml | 85% phosphoric acid |
| 1.7 g | Boron oxide |
| 6.5 g | Magnesium carbonate |

The pH of the bonding composition obtained was 1.6. An aluminum coating composition was prepared by combining the following:

| | |
|---|---|
| 20 ml | Bonding composition "L" |
| 16.0 g | Aluminum powder |

Visible signs of reaction between the bonding composition and aluminum powder were observed 4 minutes after the aluminum powder was introduced to the bonding composition. At a pH of 1.6, the magnesium in the bonding solution did not permit stability towards the aluminum powder.

A comparison of Examples 11 and 10 demonstrates the resulting instability in an aluminum coating composition when magnesium ions replace aluminum ions in a low pH (pH=1.6) bonding composition.

EXAMPLE 12

A bonding composition "M" was prepared by combining the following:

| | |
|---|---|
| 80 ml | Deionized water |
| 13.4 ml | 85% phosphoric acid |
| 1.7 g | Boron oxide |
| 6.0 g | Aluminum hydroxide |

The pH of the bonding composition obtained was 1.3. An aluminum coating composition was prepared by combining the following:

| | |
|---|---|
| 20 ml | Bonding composition "M" |
| 16.0 g | Aluminum powder |

Visible signs of reaction between the bonding composition and the aluminum powder were observed after 21 minutes following the introduction of the aluminum powder to the bonding composition.

EXAMPLE 13

A bonding composition not of the invention, "N", was prepared by replacing the aluminum hydroxide of bonding composition "M" with magnesium carbonate. Bonding composition "N" was prepared by combining the following:

| | |
|---|---|
| 80 ml | Deionized water |
| 13.4 ml | 85% phosphoric acid |
| 1.7 g | Boron oxide |
| 5.2 g | Magnesium carbonate |

The pH of the bonding solution was 1.3. An aluminum coating composition was prepared by combining the following:

| | |
|---|---|
| 20 ml | Bonding composition "N" |
| 16.0 g | Aluminum powder |

Visible signs of reaction were observed 5 minutes after introduction of the aluminum powder to the bonding composition.

Examples 12 and 13 demonstrate that at very low pH values, the stability of the system is compromised regardless of whether magnesium ions are present in solution or not, though their presence appears to accelerate instability at all pH values examined.

EXAMPLE 14

A bonding composition not of the invention, "Q", was prepared by combining the following:

| | |
|---|---|
| 100 ml | Deionized water |
| 2.0 ml | 85% phosphoric acid |
| 9.2 g | Aluminum hydroxide |

The pH of the bonding composition was 1.9. An aluminum coating composition was prepared by combining the following:

| | |
|---|---|
| 20 ml | Bonding composition "Q" |
| 16.0 g | Aluminum powder |

Visible signs of reaction between the aluminum powder and the bonding composition were observed 35 minutes after the aluminum powder was introduced to the bonding composition.

EXAMPLE 15

A bonding composition not of the invention, "R", was prepared by mixing the following:

| | |
|---|---|
| 100 ml | Deionized water |
| 20 ml | 85% phosphoric acid |
| 8.2 g | Aluminum hydroxide |
| 3.0 g | Zinc carbonate |

The pH of the bonding composition was 1.9. An aluminum coating composition was prepared by mixing the following:

| | |
|---|---|
| 20 ml | Bonding composition "R" |
| 16.0 g | Aluminum powder |

Visible signs of reaction between the aluminum powder and the bonding composition were observed 22 minutes after introducing the aluminum powder to the bonding composition.

EXAMPLE 16

A bonding composition not of the invention, "S", was prepared by combining the following:

| | |
|---|---|
| 100 ml | Deionized water |
| 20 ml | 85% phosphoric acid |
| 2.0 g | Boron oxide |
| 12.0 g | Nickel (II) carbonate |

The pH of the solution was 1.6. An aluminum coating composition was prepared by combining the following:

| | |
|---|---|
| 20 ml | Bonding composition "S" |
| 16.0 g | Aluminum powder |

Visible signs of reaction between the aluminum powder and the bonding composition were observed 10 minutes after the aluminum powder was introduced to the bonding composition.

Examples 14, 15, and 16 demonstrate that there is a relationship between aluminum ions and borate ions that promotes stability towards particulate aluminum metal in a coating composition. Examples 14 and 15 (containing aluminum ions, but no borate ions) and Example 16 (containing borate ions, but no aluminum ions) result in unsatisfactory coating compositions. A comparison of Examples 14–16 against Examples 1–5 underscores this relationship.

Examples 17–19 demonstrate the preparation of a topcoat coating based upon a bonding composition of the invention, applied to a basecoated substrate.

EXAMPLE 17

A bonding composition "T" was prepared by combining the following:

| | |
|---|---|
| 234.6 ml | Deionized water |
| 70.4 ml | 85% phosphoric acid |
| 4.7 g | Boron oxide |
| 11.7 g | Zinc oxide |
| 27.0 g | Aluminum hydroxide |

The pH of the bonding composition obtained was 1.6. A topcoat composition was prepared by combining 10 parts bonding composition "T" with one part each of 2-ethoxyethylacetate (a spraying aid) and a diluted solution of a water-soluble octylphenoxypolyethoxyethanol nonionic surfactant (a spraying aid).

The resulting topcoat composition was spray-applied to a mild steel panel basecoated with a coating composition from U.S. Pat. No. 5,478,413 (Example 2 therein), then cured at 650° F. for 30 minutes.

A Hommelwerke Model T500 Profilometer apparatus was employed to obtain $R_a$ values (in microinches) at 0.030 inch cut-off. The surface finish of the cured topcoat was measured to be <23 μin (average) taken at an 0.030 in cutoff. This is a low surface finish value, indicating a high level of film formation within the binder.

EXAMPLE 18

A bonding composition "U" was prepared by combining the following:

| | |
|---|---|
| 200 ml | Deionized water |
| 60 ml | 85% phosphoric acid |
| 4.0 g | Boron oxide |
| 10.0 g | Zinc oxide |
| 2.0 g | Lithium carbonate |
| 20.0 g | Aluminum hydroxide |

The pH of the bonding composition was 1.6. A topcoat composition was prepared by combining 10 parts bonding composition "U" with one part each of 2-ethoxyethylacetate (a spraying aid) and a diluted solution of a water-soluble octylphenoxypolyethoxyethanol nonionic surfactant (a spraying aid).

The resulting topcoat composition was spray-applied onto a mild steel panel basecoated with a coating composition from U.S. Pat. No. 5,478,413 (Example 2 therein), then cured at 650° F. for 30 minutes. The cured topcoat was a smooth coating. This Example demonstrates that lithium ion may be used effectively in a bonding composition, particularly in a topcoat application.

EXAMPLE 19

A bonding composition "V" was prepared by combining the following:

| | |
|---|---|
| 100 ml | Deionized water |
| 30 ml | 85% phosphoric acid |
| 2.0 g | Boron oxide |
| 7.5 g | Zinc oxide |
| 8.5 g | Aluminum hydroxide |

The pH of the bonding composition was 1.6. A topcoat composition was prepared by combining 10 parts bonding composition "V" with one part each of 2-ethoxyethylacetate (a spraying aid) and a diluted solution of a water-soluble octylphenoxypolyethoxyethanol nonionic surfactant (a spraying aid).

The resulting topcoat formulation was spray-applied to a mild steel panel basecoated with a coating composition from U.S. Pat. No. 5,478,413 (Example 2 therein), then cured at 650° F. for 30 minutes. The cured topcoat provided a glass-like sheen that gave a smooth surface.

EXAMPLE 20

A series of tests were conducted to survey the performance of cured coatings based on a bonding composition of the invention. The tests, and the results thereto, are set forth in Table I. Bonding compositions of the invention (specifically, the bonding compositions of Examples 1, 4 and 8) were spray-applied to a specified substrate and cured. Cured coatings based on bonding compositions of the invention were compared to cured coatings based on bonding compositions of the prior art. In particular, the prior art bonding compositions were a chromate-containing composition from Allen '251 (Example 7 therein) and a chromate-free composition from Mosser et al. U.S. Pat. No. 5,478,413 (Example 2 therein). The results are shown in Table I.

The results demonstrate that bonding compositions of the invention permit the development of cured coatings as good as, if not better than, the coatings of the prior art.

TABLE I

PERFORMANCE DATA

| TEST DESCRIPTION | REQUIREMENT | Example Nos. 1, 4, 8 | Mosser et al. '413 Ex. 2 | Allen '251 Ex. 7 |
|---|---|---|---|---|
| 1000 hrs. salt spray ASTM B117 | no galvanic attack of base metal[1] | Pass | Pass | Pass |
| 500 hrs. Salt Spray per ASTM B117 scribed "X" | no base metal attack (no white corrosion products present) | Pass | Pass | Pass |
| Bend test,[1] 90° around 14X Mandrel | no separation from base metal | Pass | Pass | Pass |
| Abrasion resistance.[1] Failing sand per ASTM D968 | >100 L/mil | Pass | Pass | Pass |
| Oxidation resistance,[1] 100 hrs. at 1000° F. (538° C.) | <1 mg/cm$^2$ weight change | Pass | Pass | Pass |
| Corrosive oxidation,[2] 24 hrs. salt spray, then 100 hrs. @ 1000° F. | no cracking, pitting, blistering; <1 mg/cm$^2$ weight change | Pass | Pass | Pass |
| Thermal salt spray,[2] 100 hrs. @ 1000° F., then 1000 hrs. salt spray | no cracking, pitting, blistering; <5 mg/cm$^2$ weight change | Pass | Pass | Pass |
| Hot Water Resistance,[3] boiling water 10 min. | no cracking, blistering, pass bend test | Pass | Pass | Pass |
| Fuel Resistance,[3] 4 hrs. immersion in ASTM Ref Fuel B | pass bend test after immersion | Pass | Pass | Pass |
| Hot Oil Resistance[4] | no peeling, blistering, softening | Pass | Pass | Pass |
| Hydraulic Fluid Resistance,[3] 24 hrs. immersson in Skydrol at 300° F. | no blistering, wrinkling, softening | Pass | Pass | Pass |

[1]Test and requirements per MIL-C-81751 Type 1 Metallic Ceramic Coating.
[2]Test method requires stainless steel.
[3]Test method requires mild steel.
[4]Test method requires mild steel be immersed for 8 hrs. in di-2-ethylhexyl sebacate + ½% phenothiazine, at 400° F.

EXAMPLE 21

A series of bonding compositions was prepared to evaluate the relationships among aluminum ions, magnesium ions, and borate ions and these ions' effect on the stability of the bonding composition towards aluminum powder. Three bonding composition series were prepared at six different pH values according to the formulations set forth in Table II: compositions containing aluminum ions and borate ions, but no magnesium ions (series A); compositions containing magnesium ions and borate ions, but no aluminum ions (series B); and compositions containing aluminum ions to the exclusion of both borate ions and magnesium ions (series C).

TABLE II

BONDING COMPOSITIONS A, B and C

| pH | | Deionized Water (ml) | 85% Phosphoric Acid (ml) | Boron Oxide (g) | Aluminum Hydroxide (g) | Magnesium Carbonate (g) |
|---|---|---|---|---|---|---|
| 1.1 | A | 100 | 20 | 2.0 | 6.8 | — |
| | B | 100 | 20 | 2.0 | — | 6.5 |
| | C | 100 | 20 | — | 6.8 | — |
| 1.3 | A | 83.3 | 16.7 | 1.7 | 6.0 | — |
| | B | 83.3 | 16.7 | 1.7 | — | 5.2 |
| | C | 83.3 | 16.7 | — | 6.0 | — |
| 1.5 | A | 100 | 20 | 2.0 | 9.0 | — |
| | B | 100 | 20 | 2.0 | — | 9.0 |
| | C | 100 | 20 | — | 9.0 | — |
| 1.6 | A | 83.3 | 16.7 | 1.7 | 8.0 | — |
| | B | 83.3 | 16.7 | 1.7 | — | 6.5 |
| | C | — | — | — | — | — |
| 1.7 | A | 100 | 20 | 2.0 | 10.0 | — |
| | B | 100 | 20 | 2.0 | — | 10.5 |
| | C | — | — | — | — | — |
| 1.8 | A | 83.3 | 16.7 | 1.7 | 8.2 | — |
| | B | 83.3 | 16.7 | 1.7 | — | 8.1 |
| | C | 83.3 | 16.7 | — | 8.2 | — |

Aluminum powder (16 g) was introduced to a sample (20 ml) of each bonding composition and the time to which a reaction could be observed between the bonding composition and the aluminum powder was measured. The results are shown in FIG. 1.

According to FIG. 1, a bonding composition employing aluminum ions and borate ions (series A) was more stable with respect to added aluminum powder at pH values below 2.0 than bonding composition series B and C. As pH increases from 1.1 to about 1.9, bonding compositions containing aluminum ions/borate ions (series A) exhibit an almost exponential increase in stability towards aluminum powder, as evidenced by the increasing time periods before reaction with aluminum powder. In contrast, bonding composition series B & C, not containing aluminum ions and borate ions together, exhibit no appreciable increase in stability towards added aluminum powder in the same pH range. The results in FIG. 1 demonstrate the unexpected stability achieved at pH values below 2.0 with the combination of aluminum ions and borate ions.

EXAMPLE 22

A stock bonding composition of the invention, "X," was prepared by mixing the following:

| | |
|---|---|
| 500 ml | Deionized water |
| 100 ml | 85% phosphoric acid |
| 12.5 g | Boron oxide |
| 55.0 g | Aluminum hydroxide |

A stock bonding composition not of the invention, "Y" was prepared by mixing the following:

| | |
|---|---|
| 500 ml | Deionized water |
| 100 ml | 85% phosphoric acid |
| 12.5 g | Boron oxide |
| 50.0 g | Magnesium carbonate |

A series of seven bonding compositions were prepared by combining varying amounts of bonding compositions "X"

with varying amounts of bonding composition "Y." Table III sets forth the formulations and the resulting concentration (mol/L) of magnesium ions in the combination bonding compositions. The combination bonding compositions had pH values between 1.71 and 1.75.

TABLE III

COMBINING BONDING COMPOSITIONS "X" and "Y"

| Solution # → | 1 | 2 | 3 | 4 | 5 | 6 | 7 |
|---|---|---|---|---|---|---|---|
| "X" (ml) | 50 | 45 | 37.5 | 25 | 12.5 | 5 | 0 |
| "Y" (ml) | 0 | 5 | 12.5 | 25 | 37.5 | 45 | 50 |
| $Mg^{+2}$ (mol/L) | 0 | 0.1 | 0.25 | 0.52 | 0.78 | 0.925 | 1.0 |

Aluminum powder (16 g) was added to a 20 ml sample of each of the bonding compositions 1–7. The time to which a reaction could be observed between the bonding composition and the aluminum powder was measured. The results are shown in FIG. 2.

According to FIG. 2, increasing amounts of magnesium ions in the bonding composition promotes decreased levels of stability with respect to aluminum powder. However, FIG. 2 also indicates that lower levels of magnesium ion in the solution, such as less than about 0.5 mol/L, permit levels of stability of at least one hour. Thus, satisfactory levels of stability with respect to aluminum powder may be achieved with an aqueous bonding composition having a pH of about 1.7 and containing phosphate ions, borate ions, aluminum ions, and magnesium ions. The results demonstrate that a bonding composition having a pH below 2.0 and free of magnesium ions is preferred; some level of magnesium ions can nonetheless be tolerated for practical purposes.

It is further understood that the present invention is not limited to the particular embodiments shown and described herein, but that various changes and modifications may be made without departing from the scope and spirit of the invention.

What is claimed is:

1. A heat curable bonding composition for coating a solid substrate, the composition comprising:
    a. water;
    b. phosphate ions;
    c. borate ions;
    d. aluminum ions;
    wherein the composition has a pH in the range from about 1.4 to about 2.2; and wherein the composition is substantially free of chromate ions, molybdate ions, and magnesium ions.

2. The bonding composition of claim 1, wherein the pH of the solution is in the range from about 1.7 to about 1.9.

3. The bonding composition of claim 1, wherein the source of aluminum ions is aluminum hydroxide.

4. The bonding composition of claim 1, wherein the source of borate ions is boron oxide or boric acid.

5. The bonding composition of claim 1, further comprising metal ions selected from the group consisting of zinc ions, nickel ions, or lithium ions.

6. The bonding composition of claim 1, wherein the molar ratio of phosphate ions to borate ions is in the range from about 3.4:1 to about 20.3:1.

7. The bonding composition of claim 1, wherein the molar ratio of aluminum ions to phosphate ions is from about 0.1:1 to about 0.75:1.

8. The bonding composition of claim 1, wherein the molar ratio of the sum of aluminum ions and borate ions to phosphate ions is in the range from about 0.25:1 to about 0.85:1.

9. A heat curable coating composition comprising metallic aluminum particles dispersed in a bonding composition, the bonding composition comprising:
    a. water;
    b. phosphate ions;
    c. borate ions;
    d. aluminum ions, wherein the amount of aluminum ions in solution is less than necessary to equilibrate the solution with respect to the metallic aluminum particles;
    wherein the composition has a pH in the range from about 1.4 to about 2.2; and wherein the composition is substantially free of chromate ions, molybdate ions, and magnesium ions.

10. The coating composition of claim 9, wherein the pH of the bonding composition is in the range from about 1.7 to about 1.9.

11. The coating composition of claim 9, wherein the source of aluminum ions is aluminum hydroxide.

12. The coating composition of claim 9, wherein the source of borate ions is boron oxide or boric acid.

13. The coating composition of claim 9, further comprising metal ions selected from the group consisting of zinc ions, nickel ions, or lithium ions.

14. The coating composition of claim 9, wherein the molar ratio of phosphate ions to borate ions is in the range from about 3.4:1 to about 20.3:1.

15. The coating composition of claim 9, wherein the molar ratio of aluminum ions to phosphate ions is from about 0.1:1 to about 0.75:1.

16. The coating composition of claim 9, wherein the molar ratio of the sum of aluminum ions and borate ions to phosphate ions is in the range from about 0.25:1 to about 0.85:1.

17. heat curable topcoat coating composition comprising the bonding composition of claim 1.

18. An article of manufacture comprising a substrate with a coating, the coating prepared in accordance with a method comprising the steps of:
    a. providing a heat curable coating composition comprising metallic aluminum particles dispersed in a bonding composition, the bonding composition comprising:
        i) water;
        ii) phosphate ions;
        iii) borate ions;
        iv) aluminum ions, wherein the amount of aluminum ions in solution is less than necessary to equilibrate the solution with respect to the metallic aluminum particles;
    wherein the composition has a pH in the range from about 1.4 to about 2.2; and wherein the composition is substantially free of chromate ions, molybdate ions, and magnesium ions;
    b. applying the coating composition to the substrate; and
    c. heating the substrate with the coating composition applied thereon to form a heat cured coating.

19. The article of manufacture of claim 18, wherein the pH of the bonding composition is in the range from about 1.7 to about 1.9.

20. The article of manufacture of claim 18, wherein the bonding composition further comprises metal ions selected from the group consisting of zinc ions, nickel ions, or lithium ions.

21. The article of manufacture of claim 18, wherein the molar ratio of phosphate ions to borate ions in the bonding composition is in the range from about 3.4:1 to about 20.3:1.

22. The article of manufacture of claim 18, wherein the molar ratio of aluminum ions to phosphate ions in the bonding composition is from about 0.1:1 to about 0.75:1.

23. The article of manufacture of claim 18, wherein the molar ratio of the sum of aluminum ions and borate ions to phosphate ions in the bonding composition is in the range from about 0.25:1 to about 0.85:1.

24. An article of manufacture comprising a substrate with a coating, the coating prepared in accordance with a method comprising the steps of:
   a. providing a heat curable topcoat coating composition comprising:
      i) water;
      ii) phosphate ions;
      iii) borate ions;
      iv) aluminum ions, and
   wherein the coating composition has a pH in the range from about 1.4 to about 2.2; and wherein the composition is substantially free of chromate ions, molybdate ions, and magnesium ions;
   b. applying the coating composition to the substrate; and
   c. heating the substrate with the coating composition applied thereon to form a heat cured coating.

25. The article of manufacture of claim 24, wherein the pH of the topcoat coating composition is in the range from about 1.7 to about 1.9.

26. The article of manufacture of claim 24, wherein the topcoat coating composition further comprises metal ions selected from the group consisting of zinc ions, nickel ions, or lithium ions.

27. The article of manufacture of claim 24, wherein the molar ratio of phosphate ions to borate ions in the topcoat coating composition is in the range from about 3.4:1 to about 20.3:1.

28. The article of manufacture of claim 24, wherein the molar ratio of aluminum ions to phosphate ions in the topcoat coating composition is from about 0.1:1 to about 0.75:1.

29. The article of manufacture of claim 24, wherein the molar ratio of the sum of aluminum ions and borate ions to phosphate ions in the topcoat coating composition is in the range from about 0.25:1 to about 0.85:1.

* * * * *